United States Patent
Nishiyama

(10) Patent No.: US 10,072,409 B2
(45) Date of Patent: Sep. 11, 2018

(54) BACKFLOW PREVENTION APPARATUS

(71) Applicant: TLV CO., LTD., Hyogo (JP)

(72) Inventor: Toshimasa Nishiyama, Kakogawa (JP)

(73) Assignee: TLV CO., LTD., Hyogo (JP)

( * ) Notice: Subject to any disclaimer, the term of this patent is extended or adjusted under 35 U.S.C. 154(b) by 0 days.

(21) Appl. No.: 15/459,922

(22) Filed: Mar. 15, 2017

(65) Prior Publication Data

US 2017/0183860 A1    Jun. 29, 2017

Related U.S. Application Data

(63) Continuation of application No. PCT/JP2015/075941, filed on Sep. 14, 2015.

(30) Foreign Application Priority Data

Sep. 18, 2014 (JP) ................. 2014-189680

(51) Int. Cl.
*E03F 7/04* (2006.01)
*F16K 31/22* (2006.01)
(Continued)

(52) U.S. Cl.
CPC ............. *E03F 7/04* (2013.01); *E03F 5/042* (2013.01); *E03F 5/0405* (2013.01);
(Continued)

(58) Field of Classification Search
CPC .......... E03F 7/04; F16K 15/063; F16K 31/22; F16K 31/18; F16K 33/00; F16K 15/04;
(Continued)

(56) References Cited

U.S. PATENT DOCUMENTS 3,929,155 A * 12/1975 Garretson ............... F16K 31/18
137/430
4,917,795 A * 4/1990 Sable et al. .......... B01D 36/001
137/202

(Continued)

FOREIGN PATENT DOCUMENTS

JP    H06-067588 U    9/1994

OTHER PUBLICATIONS

International Search Report issued in PCT/JP2015/075941; dated Nov. 17, 2015.

*Primary Examiner* — Kevin Lee
(74) *Attorney, Agent, or Firm* — Studebaker & Brackett PC

(57) ABSTRACT

A backflow prevention apparatus is provided with a check valve and a float-type backflow prevention valve, these being installed in this order as one proceeds from upstream to downstream. The check valve comprises a valve seat; a valve member that closes the valve at the valve seat due to an upwardly directed restoring force; and a restoring force exerting member that exerts an upwardly directed restoring force on the valve member. The float-type backflow prevention valve comprises an annular valve seat; a float that rises in accompaniment to a rise in a water level of wastewater to close the valve at the annular valve seat; a guide member that guides movement of the float in a vertical direction; and a constraining member that constrains a lowermost position to which the float can move.

3 Claims, 7 Drawing Sheets

(51) Int. Cl.
  *F16K 15/06* (2006.01)
  *F16K 33/00* (2006.01)
  *E03F 5/04* (2006.01)
  *E03F 5/042* (2006.01)
  *F16K 15/02* (2006.01)
  *F16K 17/36* (2006.01)
  *E03C 1/298* (2006.01)

(52) U.S. Cl.
  CPC .......... *F16K 15/023* (2013.01); *F16K 15/063* (2013.01); *F16K 17/36* (2013.01); *F16K 31/22* (2013.01); *F16K 33/00* (2013.01); *E03C 1/298* (2013.01); *E03F 2005/0417* (2013.01)

(58) Field of Classification Search
  CPC . F16K 15/044; F16K 15/06; F17C 2250/0413
  USPC ...................................... 137/540, 613, 614.2
  See application file for complete search history.

(56) References Cited

U.S. PATENT DOCUMENTS

| | | | | |
|---|---|---|---|---|
| 5,842,500 | A | * | 12/1998 | Rockwood et al. .... F16K 1/302 137/413 |
| 6,929,023 | B2 | * | 8/2005 | Whitaker et al. ......... E03F 7/04 137/315.33 |
| 2005/0268969 | A1 | * | 12/2005 | Zakai et al. .............. G01F 1/26 137/540 |
| 2009/0139581 | A1 | * | 6/2009 | Herlihy ................ F16K 24/044 137/202 |
| 2016/0377195 | A1 | * | 12/2016 | Milroy ................... F16K 47/08 137/12 |

\* cited by examiner

BACKFLOW PREVENTION APPARATUS

CROSS-REFERENCE TO RELATED APPLICATION

This is a continuation of PCT International Application PCT/JP2015/075941 filed on Sep. 14, 2015, which claims priority to Japanese Patent Application No. 2014-189680 filed on Sep. 18, 2014. The disclosures of these applications including the specifications, the drawings, and the claims are hereby incorporated by reference in their entirety.

FIELD

This invention relates to a backflow prevention apparatus such as may be installed in a wastewater drainage system that causes wastewater generated within a building or on the premises of a factory or the like to be discharged into a river, ocean, public sewer facility, or the like.

BACKGROUND

To ensure that drainage of wastewater occurs in the forward direction from upstream to downstream, float-type backflow prevention valves for prevention of backflow have conventionally been installed in wastewater drainage systems that cause wastewater generated within buildings or on the premises of factories or the like to be discharged into rivers, oceans, public sewer facilities, and so forth. Float-type backflow prevention valves are exemplified by Japanese Utility Model Application Publication Kokai No. H6[1994]-67588.

A float-type backflow prevention valve might typically be provided with an annular valve seat by way of which an upstream side and a downstream side of a wastewater drainage system may be placed in mutual communication, a float that is disposed below the annular valve seat, a plurality of guide members that guide the float in a vertical direction, and so forth. The float rises and falls to open and close the annular valve seat in accompaniment to water level of the wastewater. Because water level is low during normal operation, this causes the float to fall onto (rest on) a base below the annular valve seat, opening the valve at the annular valve seat. Drainage of wastewater is thus able to occur in the forward direction from upstream to downstream as a result of passage through the annular valve seat. On the other hand, because water level rises when there is occurrence of backflow, this causes the float to rise, closing the valve at the annular valve seat. As a result, backflow into (flooding of) locations upstream of the annular valve seat is prevented.

Furthermore, where a plurality of buildings are, for example, connected to a single wastewater drainage system, it may be that wastewater generated at each of the respective buildings is handled by the single wastewater drainage system. Where this is the case, a plurality of float-type backflow prevention valves might be installed at the wastewater drainage system to prevent backflow to the respective buildings.

SUMMARY

While the aforementioned float-type backflow prevention valves control flow of wastewater so as to prevent backflow thereof, they do not permit control of flow of air (gas). Because during normal operation the valve at the annular valve seat is open, air is free to move about within the wastewater drainage system. For this reason, it may be the case that gas and the like produced such as may be at drainage basins and so forth of the wastewater drainage system will travel through the wastewater drainage system in backflow fashion and flow into building(s). Furthermore, in the context of a wastewater drainage system in which a plurality of buildings are connected, where a fire has occurred within one building, it may be the case that smoke and the like from the fire will flow into the wastewater drainage system and will flow (backflow) into other building(s).

This invention provides a backflow prevention apparatus, an object of which is to also stop flow of gas while preventing backflow of wastewater by means of a float.

A backflow prevention apparatus which is provided by this invention and which is installed in a wastewater drainage system that causes drainage of wastewater to occur from upstream to downstream is provided with a check valve and a float-type backflow prevention valve, these being installed in this order as one proceeds from upstream to downstream in the wastewater drainage system. The check valve is disposed above the float-type backflow prevention valve and comprises a valve seat that is open in a vertical direction and that causes a location toward the float-type backflow prevention valve and a location upstream therefrom in the wastewater drainage system to be placed in mutual communication; a valve member that is disposed below the valve seat, that closes the valve at the valve seat as a result of being made to come in contact with the valve seat due to an upwardly directed restoring force, and that opens the valve at the valve seat as a result of being made to fall when the restoring force is overcome by a hydraulic head of wastewater flowing thereinto from a location upstream therefrom and a restoring force exerting member that exerts an upwardly directed restoring force on the valve member. Furthermore, the check valve is such that at least components responsible for causing closure of the valve at the valve seat by the valve member—which include the valve seat, the valve member, and the restoring force exerting member—are formed from metal. The float-type backflow prevention valve comprises an annular valve seat that is open in a vertical direction and that causes a location downstream therefrom in the wastewater drainage system and a location toward the check valve to be placed in mutual communication; a float that is disposed so as to be capable of movement in a vertical direction below the annular valve seat, that rises in accompaniment to a rise in a water level of wastewater and engages with the opening and closes the opening to close the valve at the annular valve seat, and that falls in accompaniment to a fall in a water level of wastewater and opens the opening to open the valve at the annular valve seat; a guide member that guides movement of the float in a vertical direction; and a constraining member that constrains a lowermost position to which the float can move.

The restoring force exerting member may be a coil spring.

In accordance with this invention, a check valve installed at a location upstream from a float-type backflow prevention valve makes it possible to stop movement of gas between upstream and downstream locations in the wastewater drainage system, and at a time when there would otherwise be occurrence of backflow, the float-type backflow prevention valve makes it possible to prevent such backflow. Furthermore, because wastewater generated at a upstream location can be discharged to a downstream location by way of the check valve and the float-type backflow prevention valve, it will be possible while maintaining wastewater drainage capability to prevent backflow of wastewater and to also stop movement of gas.

Furthermore, where at least the components responsible for causing closure of valve(s) at valve seat(s) by valve member(s)—which include valve seat(s), valve member(s), and restoring force exerting member(s)—are formed from metal(s), it will be possible to cause valve(s) at valve seat(s) to remain in their closed state(s) despite occurrence of fire, making it possible to even more definitively stop movement of gas upstream and downstream therefrom.

Also, by causing valve seat(s) and valve member(s) to be made of metal(s), this will make it possible to achieve a situation in which valve(s) at valve seat(s) are not completely closed. This makes it possible to prevent damage to the float, e.g., deformation thereof due to violent contact with the annular valve seat, at a time when there is occurrence of backflow. There can also be backflow of air at times such as when there is sudden surge of backflow water. This being the case, this air can accumulate in the vicinity of the region below the check valve. Air pressure at locations downstream from the check valve may therefore become higher than air pressure at locations upstream therefrom. But because in the present case the valve at the valve seat of the check valve is not completely closed, this difference in air pressure causes a considerable amount of air to pass through the valve seat (opening) as it moves from the downstream side to the upstream side thereof. For this reason, there is gradual decrease in the air pressure at the downstream side of the check valve, and gradual increase in the water level that will exist at a time when there is occurrence of backflow. In accompaniment hereto, the float also gradually rises, until the valve at the annular valve seat is closed thereby.

DESCRIPTION OF EMBODIMENTS

A backflow prevention apparatus that is an embodiments of this invention will be described with reference to the drawings. Note that the constitution of this invention is not to be limited by the following embodiments.

Embodiment 1

Figure 1A:
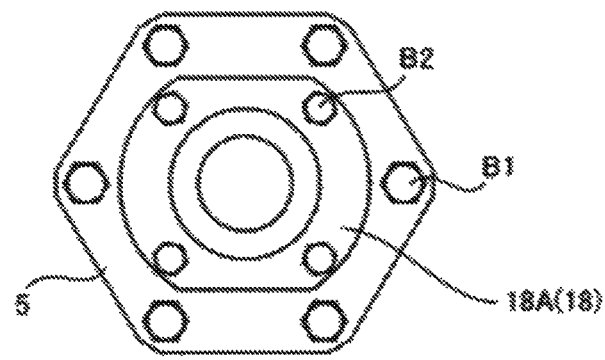
FIG. 1A is a plan view of a backflow prevention apparatus associated with Embodiment 1 of this invention.
Figure 1B:
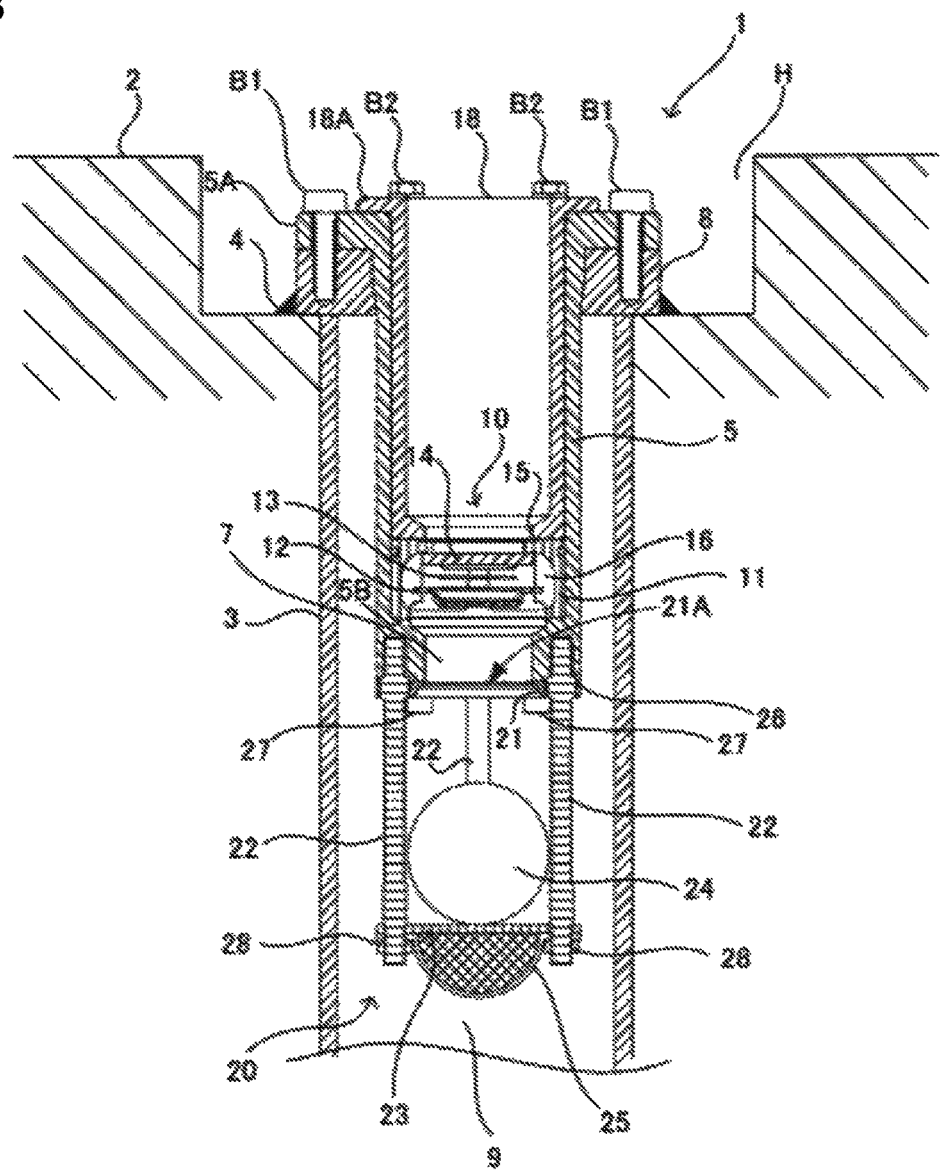
FIG. 1B is a sectional view of a backflow prevention apparatus associated with Embodiment 1 of this invention.
Figure 2:
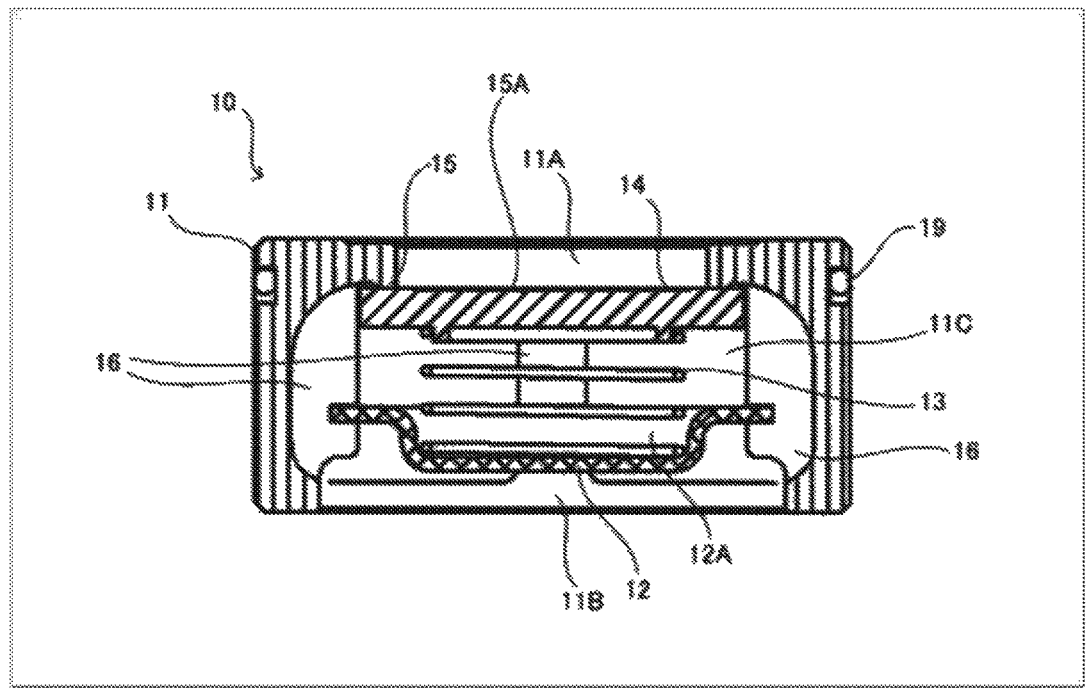
FIG. 2 is an enlarged sectional view of a check valve included within a backflow prevention apparatus.
Figure 3:
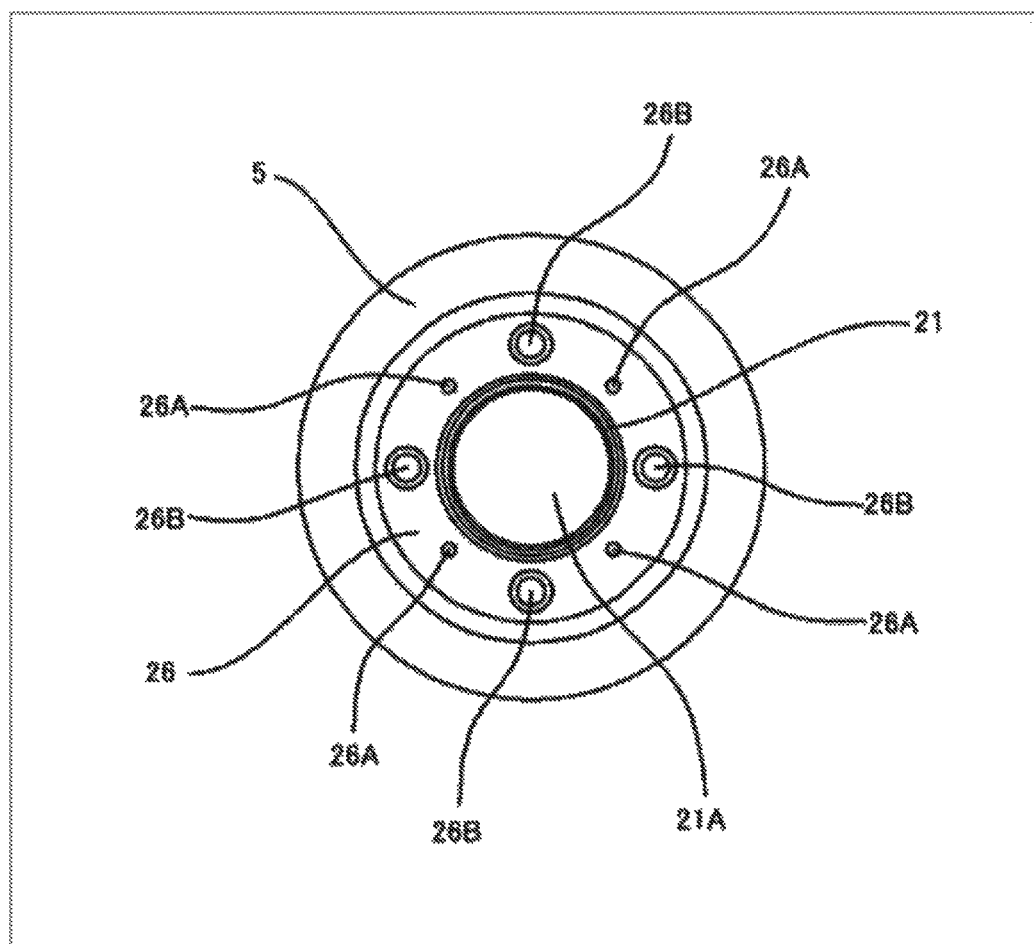
FIG. 3 is a drawing, as seen from a location downstream therefrom, of a situation in which an annular valve seat and a valve seat retainer have been attached to a body of a float-type backflow prevention valve.
Figure 4:
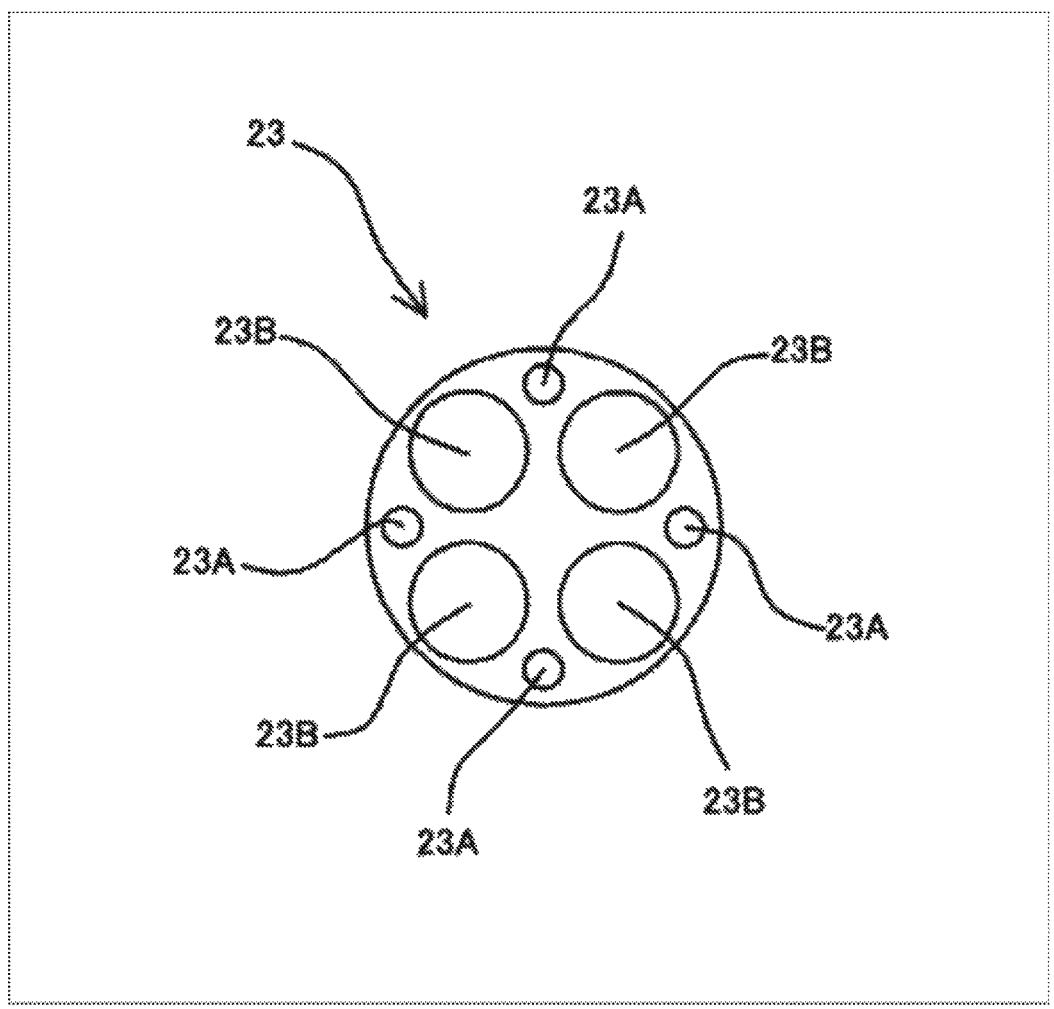
FIG. 4 is a plan view of a base at a float-type backflow prevention valve.

FIG. 1A is a plan view of a backflow prevention apparatus associated with Embodiment 1 of this invention; FIG. 1B is a sectional view of backflow prevention apparatus 1. FIG. 2 is an enlarged sectional view of check valve 10 included within backflow prevention apparatus 1. FIG. 3 is a drawing, as seen from a location downstream therefrom, of a situation in which annular valve seat 21 and valve seat retainer 26 have been attached to body 5 of float-type backflow prevention valve 20; FIG. 4 is a plan view of base 23 of float-type backflow prevention valve 20. At FIG. 1A, note that various components such as floor 2 and the like have been omitted for convenience of illustration.

As shown at FIG. 1A and FIG. 1B, backflow prevention apparatus 1 of this embodiment, which is installed in a wastewater drainage system causing wastewater generated at floor 2 within a building to be discharged into a river, ocean, or the like, prevents backflow of water from the river or the like to floor 2. Furthermore, backflow prevention apparatus 1 stops flow of gas that might otherwise occur between drainage pipe 3 and floor 2 of the building. The wastewater drainage system comprises a recess H formed in floor 2, a drainage pipe 3 extending in a downward direction from the bottom of recess H, and so forth. Backflow prevention apparatus 1 is installed at a top end portion of this drainage pipe 3.

Backflow prevention apparatus 1 is provided with body 5, float-type backflow prevention valve (hereinafter "backflow prevention valve") 20 and disc-type check valve 10 (hereinafter "check valve") which are attached to body 5, and so forth. Body 5 is shaped after the fashion of a counterbored cylinder of circular cross-section arranged so as to extend in a vertical direction and so as to have upstream port 7. Furthermore, body 5 has flange 5A at a top end thereof. This flange 5A is secured by bolts B1 to fixture 8. Fixture 8 is rigidly mounted to floor 2 (the bottom of recess H) by weld 4.

Check valve 10 is provided with check valve body 11, spring seat 12 which is installed at the interior of check valve body 11, coil spring 13, valve member 14, and so forth. Check valve body 11 has upstream opening 11A, downstream opening 11B, and valve chamber 11C by way of which these openings 11A and 11B may be placed in mutual communication. Check valve body 11 is held (secured) between check valve retainer 18 and counterbore region 5B of body 5. Upstream opening 11A permits mutual communication to occur between the interior of check valve retainer 18 and both valve chamber 11C and communication opening 15A. Downstream opening 11B permits mutual communication to occur between upstream port 7 and valve chamber 11C. Check valve retainer 18, which is cylindrically shaped, is arranged so as to extend in a vertical direction and is such that flange 18A at the top end thereof is secured to flange 5A of body 5 by bolts B2.

Furthermore, annular valve seat 15 is formed at upstream opening 11A at a location thereof which is toward valve chamber 11C. Annular valve seat 15, which has communication opening 15A, permits valve chamber 11C and upstream opening 11A to be placed in mutual communication by way of communication opening 15A. Moreover, guides 16 are formed in the sidewall of valve chamber 11C. Guides 16, which are formed in the sidewall of valve chamber 11C at four locations over between upstream opening 11A and downstream opening 11B, guide the movement of valve member 14 in the vertical direction. Note that whereas guides 16 and annular valve seat 15 of this embodiment are formed in integral fashion with respect to check valve body 11, these may be formed separately. Furthermore, O-ring 19 is installed in a groove formed at the outside circumference of check valve body 11. O-ring 19, which may, for example, be a ring made of rubber, prevents leakage of wastewater from the gap between check valve body 11 and body 5.

Spring seat 12, which is of discoid shaped, supports coil spring 13 by means of recess 12A. Recess 12A, the inside diameter of which is approximately equal to the outside diameter of coil spring 13, also constrains movement of coil spring 13 in the horizontal direction. Spring seat 12 is supported by guides 16 as a result of engagement of the edge thereof by grooves formed in guides 16. Furthermore, rotation of spring seat 12 is constrained by antirotation machine screw(s) (not shown). Coil spring 13 exerts an upwardly directed restoring force on valve member 14. Valve member 14 is such that a protruding region at the discoid bottom thereof engages loosely with the top end of coil spring 13, opening and closing annular valve seat 15. Actuation causing annular valve seat 15 to be opened and closed by valve member 14 is described below. Note that, except for O-ring 19, the respective components making up check valve 10 of the present embodiment may, for example, be made from stainless steel or other such metal(s).

Backflow prevention valve 20 is provided with annular valve seat 21 attached to body 5; four guide rods 22; base 23 attached to guide rods 22; float 24 installed at a location toward the interior from base 23, guide rods 22, and annular valve seat 21; and so forth. Furthermore, backflow prevention valve 20 is also provided with strainer 25.

Annular valve seat 21, which may, for example, be made of rubber, has communication opening 21A at the center thereof. Annular valve seat 21 is pressed on and secured in place by the bottom end of body 5 by way of valve seat retainer 26 (see FIG. 3) which intervenes therebetween. Annular valve seat 21 permits drainage pipe 3 at a downstream location and upstream port 7 at an upstream location to be placed in mutual communication by way of communication opening 21A.

As shown in FIG. 3, valve seat retainer 26 is of annular construction. Valve seat retainer 26 has threaded holes 26B for insertion of guide rods 22 and machine-screw-threaded holes 26A for insertion of machine screws 27 (see FIG. 1B) by means of which annular valve seat 21 is secured. Note that, as shown in FIG. 1B, valve seat retainer 26 is secured to body 5 by machine screws 27.

The four guide rods 22, which are made from stainless steel or other such metal(s), are secured to and supported by body 5 by virtue of the fact that the top end portions thereof are threadedly joined to machine-screw-threaded holes 26B provided in regularly spaced fashion at the bottom end of body 5. These four guide rods 22 guide float 24 in the vertical direction. Note that at least three guide rods 22 should be provided.

Furthermore, the bottom end portions of guide rods 22 are made to pass through guide rod holes 23A (see FIG. 4) in base 23, and while in this state they are threadedly engaged with nuts 28. Base 23, which is supported by nuts 28 in such fashion as to cause the face(s) thereof to be horizontal, is located below float 24 and constrains the lowermost position to which float 24 can move. Note that it is not necessary that the face(s) of base 23 be supported in precisely horizontal fashion, it being sufficient that this be more or less horizontal. Furthermore, as shown in FIG. 4, base 23 has a plurality of through-holes 23B for allowing wastewater to pass therethrough.

As shown in FIG. 1B, float 24, which is formed from stainless steel or other such metal(s), is shaped after the fashion of a hollow sphere. Float 24, which is formed such that the specific gravity thereof is lighter than that of wastewater, moves in a vertical direction (rises and falls) between base 23 and annular valve seat 21 in accompaniment to changes in water level within drainage pipe 3. When float 24 falls, it assumes a state in which it rests on base 23 as shown in FIG. 1B. Furthermore, the rising and falling of float 24 causes annular valve seat 21 to be opened and closed.

Strainer 25, which is a wire mesh basket formed from stainless steel or other such metal(s), causes debris and the like such as may be included within wastewater to become trapped therewithin. This prevents the interior of drainage pipe 3 from becoming clogged. Strainer 25 is supported at the edge thereof by nuts 28 and guide rods 22 in similar fashion as was the case with base 23.

Figures 5A, 5B:
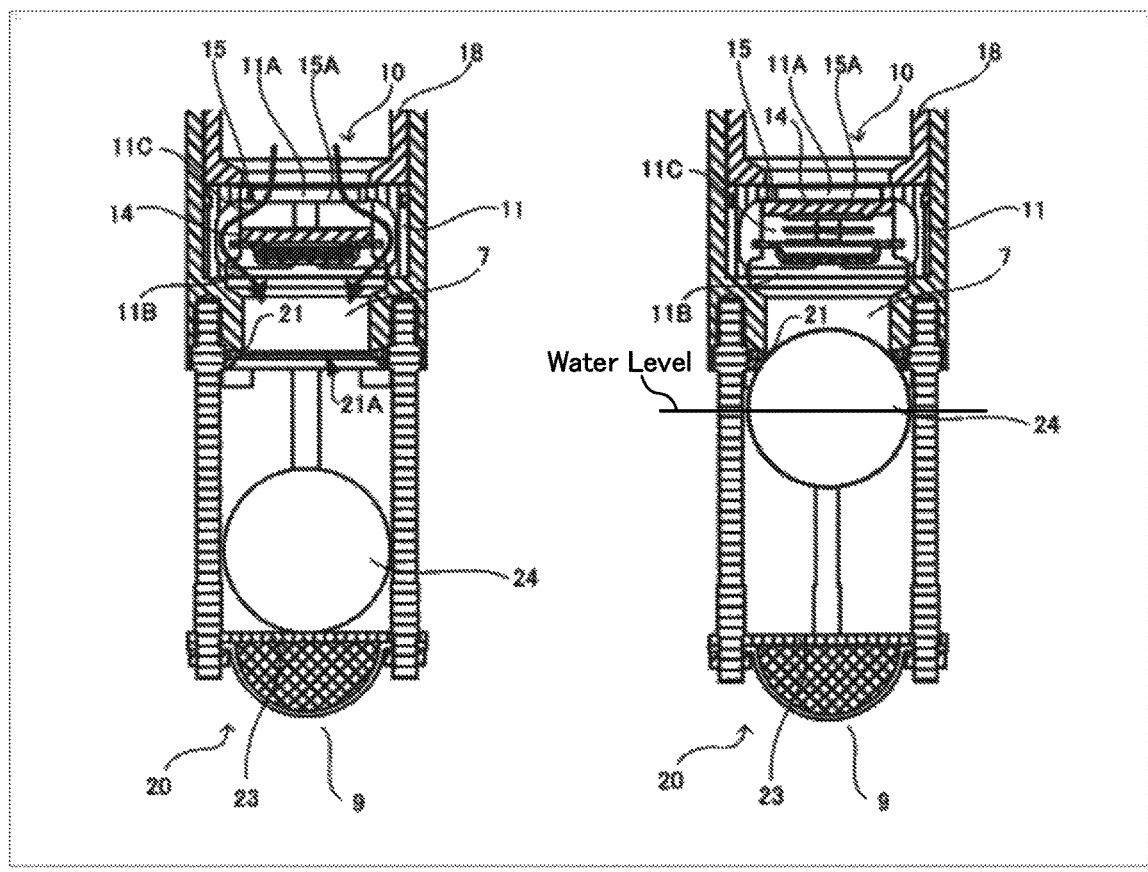
FIG. 5A is an explanatory diagram showing operation of a backflow prevention apparatus during normal operation.
FIG. 5B is an explanatory diagram showing operation of a backflow prevention apparatus when there is occurrence of backflow.

FIG. 5A is an explanatory diagram showing operation of backflow prevention apparatus 1 when wastewater flows thereinto from an upstream location during normal operation, and FIG. 5B is an explanatory diagram showing operation of backflow prevention apparatus 1 when there is occurrence of backflow.

During normal operation, when wastewater is not being generated, the restoring force causes valve member 14 of check valve 10 to come in contact with annular valve seat 15 as shown in FIG. 1B (FIG. 5B), closing the valve at annular valve seat 15. Furthermore, when wastewater is being generated, the hydraulic head of the wastewater flowing into the interior of check valve retainer 18 from floor 2 and so forth overcomes the restoring force and causes valve member 14 to fall as shown in FIG. 5A. This causes the valve at annular valve seat 15 to be opened. Wastewater can then travel in the directions indicated by the arrows at FIG. 5A to pass through check valve retainer 18 and annular valve seat 15 and flow into upstream port 7.

Furthermore, during normal operation, float 24 of backflow prevention valve 20 falls due to such factors as the dead weight thereof, causing it to fall onto (rest on) base 23 as shown in FIG. 1B (FIG. 5A), opening the valve at annular valve seat 21. This is because the water level within drainage pipe 3 is typically lower than the location at which base 23 is arranged. Accordingly, wastewater that has passed through check valve 10 and flowed into upstream port 7 passes through communication opening 21A, the space between guide rods 22, and through-holes 23B to flow into downstream port 9, and is ultimately discharged into a river or the like (downstream).

On the other hand, at a time when there is backflow of water from a location downstream therefrom, the restoring force causes valve member 14 of check valve 10 to come in contact with annular valve seat 15 as shown in FIG. 5B, causing the valve at annular valve seat 15 to remain closed. On the other hand, because the water level within drainage pipe 3 rises toward annular valve seat 21 from a location downstream therefrom, float 24 of backflow prevention valve 20, due to such factors as the buoyancy thereof, floats thereon in such fashion that the lower half or similar portion thereof is, for example, in a partially submerged state. As a result, float 24 causes the valve at annular valve seat 21 to become closed as shown in FIG. 5B.

Accordingly, it is possible to definitively prevent overflow onto (flooding of) floor 2 and the like that might otherwise occur were there to be backflow of water to locations upstream of annular valve seat 21. Note that float 24 need not be precisely in the shape of a sphere, it being sufficient that the shape thereof approximate a sphere to an extent such as will allow the valve at annular valve seat 21 to be closed thereby.

Furthermore, because, as described above, check valve 10 is closed at times other than when there is wastewater, movement of gas between the downstream side and the upstream side of check valve 10 is stopped. It will therefore be possible to prevent flow (backflow) of gas and the like such as may be produced at drainage basins and so forth of the wastewater drainage system into building(s) upstream of check valve 10. Furthermore, it will also be possible to prevent smoke and the like such as may be produced by fire or the like within building(s) from leaking into the wastewater drainage system and flowing (in backflow fashion) into other building(s). And because check valve 10 is made of metal(s), it will not melt despite occurrence of fire or the like unless it reaches an unusually high temperature. Valve(s) at valve seat(s) will therefore remain in their closed state(s) despite occurrence of fire, making it possible to even more definitively stop movement of gas upstream and downstream therefrom.

Also, because in this embodiment annular valve seat 15 and valve member 14 are made of metal(s), the valve at annular valve seat 15 will not be completely closed (sealed) by valve member 14. This makes it possible to prevent damage to float 24, e.g., deformation thereof as a result of violent contact with annular valve seat 21, when there is occurrence of backflow. There can also be backflow of air at times such as when there is sudden surge of backflow water. This being the case, this air can accumulate in the vicinity of the region below check valve 10. Air pressure at locations downstream from check valve 10 may therefore become higher than air pressure at locations upstream therefrom. But because in the present case the valve at annular valve seat 15 is not completely closed, this difference in air pressure causes a considerable amount of air to pass through annular valve seat 15 (communication opening 15A) of check valve 10 as it moves from the downstream side to the upstream side thereof. For this reason, there is gradual decrease in the air pressure at the downstream side of check valve 10, and gradual increase in the water level that will exist at a time when there is occurrence of backflow. In accompaniment hereto, float 24 also gradually rises, until the valve at annular valve seat 21 is closed thereby. It is therefore possible to prevent damage to float 24 as has been described above.

As described above, by installing a check valve at a location upstream from a float-type backflow prevention valve, it is possible while maintaining wastewater drainage capability to prevent backflow of wastewater and to also stop movement of gas.

Embodiment 2

This embodiment differs from the aforementioned Embodiment 1 in that the constitution is such that a backflow prevention valve is provided between two drainage pipes. Aspects with respect to which the constitution differs will be described with reference to FIG. 6. As the constitution is in other respects similar to that of Embodiment 1, description will be omitted where unnecessary.

Figure 6:
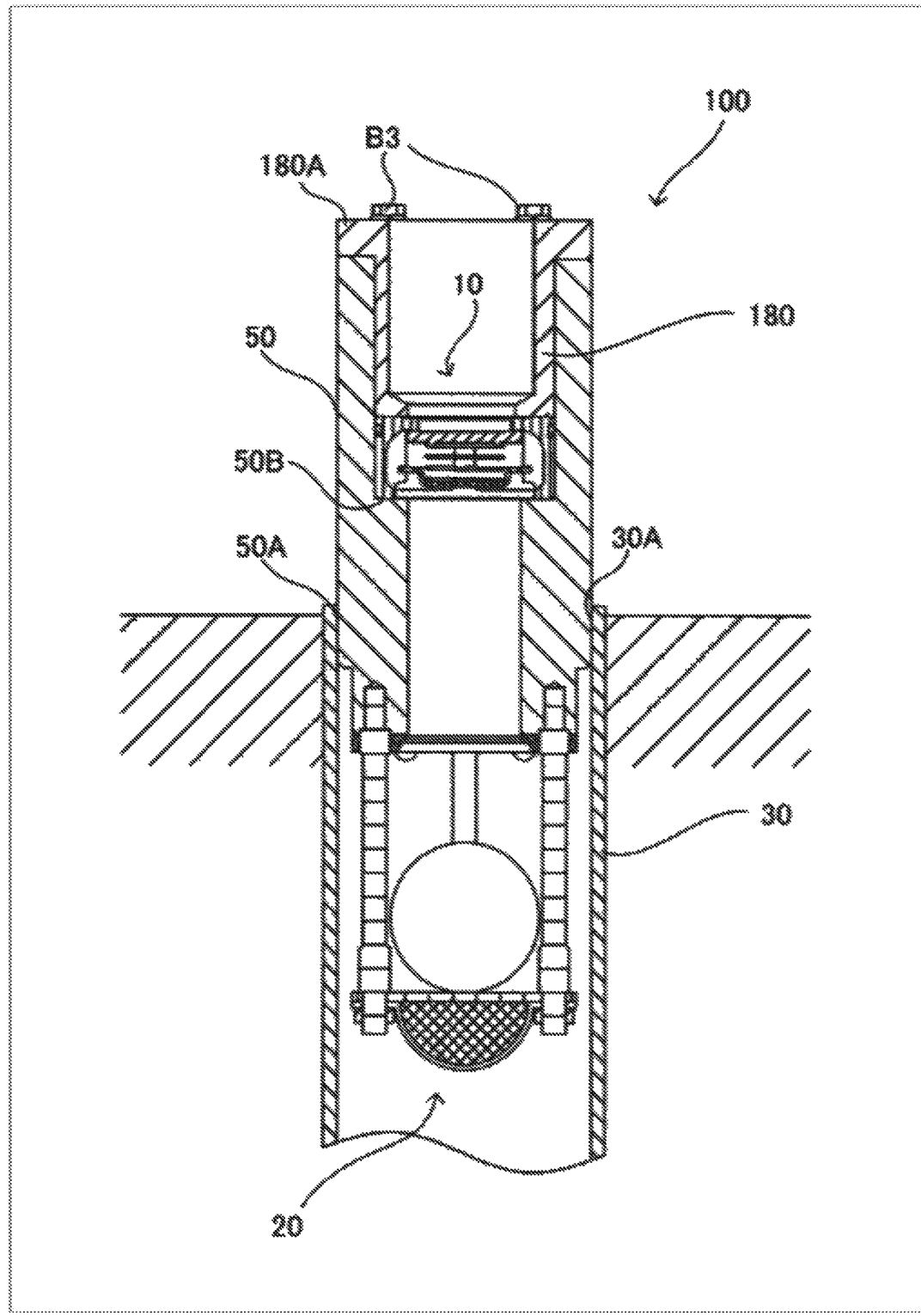
FIG. 6 is a sectional view of a backflow prevention apparatus associated with Embodiment 2 of this invention.

FIG. 6 is a sectional view of backflow prevention apparatus 100 associated with Embodiment 2 of this invention. A portion of the outside circumference of body 50 of backflow prevention apparatus 100 has male threads 50A. Backflow prevention apparatus 100 is attached to drainage pipe 30 by causing these male threads 50A to be threadedly joined to female threads 30A formed at a portion of the inside circumference of drainage pipe 30. Check valve 10 is held between counterbore region 50B of body 50 and check valve retainer 180. Check valve retainer 180 is such that flange 180A at the top end thereof is secured to body 50 by bolts B3.

Furthermore, at the top end of body 50, an upstream drainage pipe, not shown, is connected thereto as a result of being threadedly joined thereto in the same manner as drainage pipe 30.

Embodiment 3

This embodiment differs from the aforementioned Embodiment 1 in that the constitution is such that a backflow prevention apparatus is provided between two drainage pipes. Furthermore, this differs from the aforementioned Embodiment 2 in that the constitution is such that a fixture is used to cause the backflow prevention apparatus to be provided between two drainage pipes. Aspects with respect to which the constitution differs will be described with reference to FIG. 7. As the constitution is in other respects similar to that of Embodiment 1, description will be omitted where unnecessary.

Figure 7:
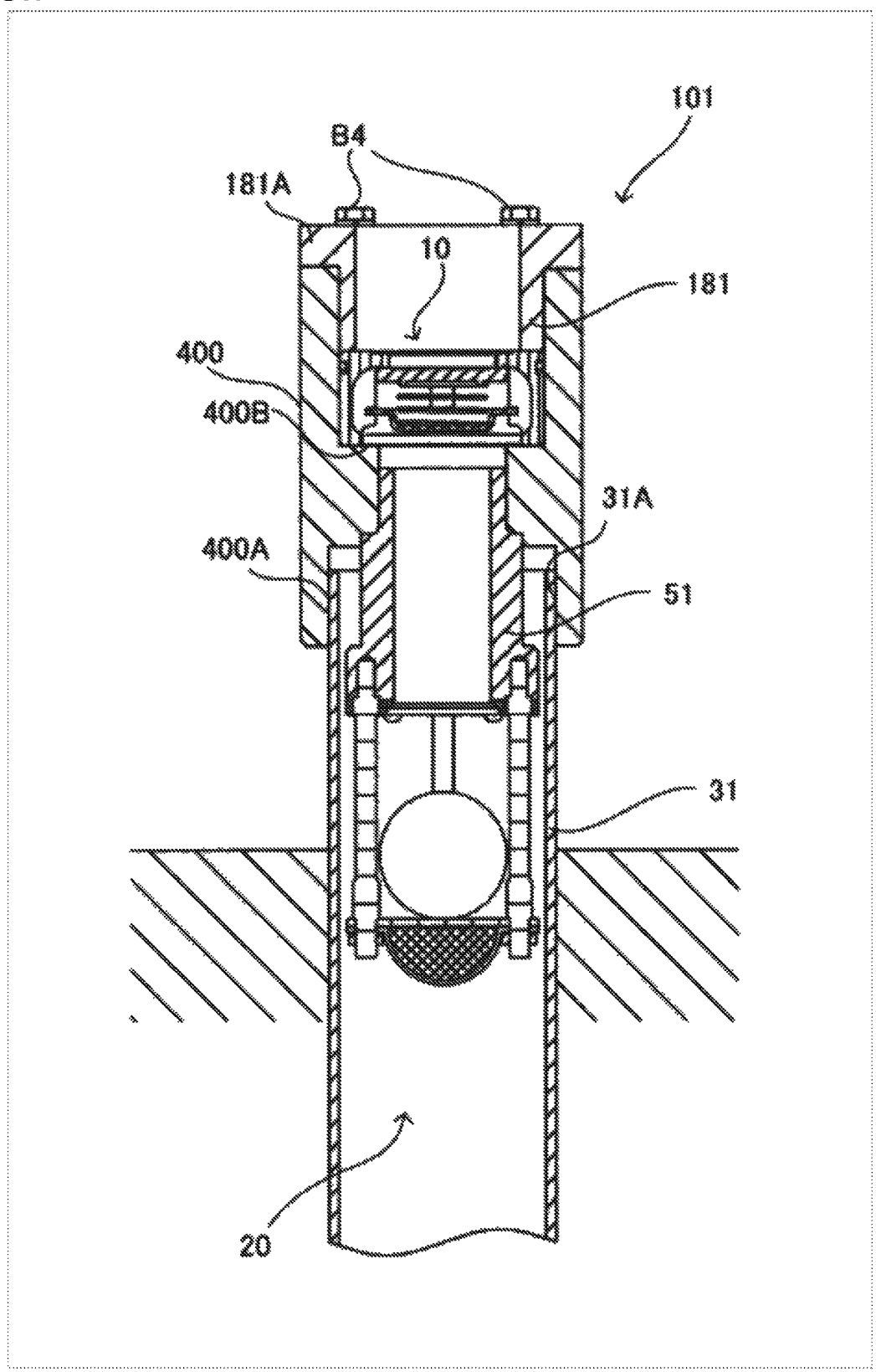
FIG. 7 is a sectional view of a backflow prevention apparatus associated with Embodiment 3 of this invention.

FIG. 7 is a sectional view of backflow prevention apparatus 101 associated with Embodiment 3 of this invention. Body 51 of backflow prevention apparatus 101 is such that the top end outside circumference which protrudes from drainage pipe 31 is threadedly joined to fixture 400. Fixture 400, which is more or less cylindrical in shape, is such that female threads 400A provided at the inside circumference thereof are threadedly joined to male threads 31A provided on the outside circumference at an end portion of drainage pipe 31. This causes backflow prevention apparatus 101 to be attached to drainage pipe 31 by way of fixture 400 which intervenes therebetween. Check valve 10 is held between counterbore region 400B of fixture 400 and check valve retainer 181 in such fashion that it is connected to the top end of body 51. Check valve retainer 181 is such that flange 181A at the top end thereof is secured by screws B4.

Furthermore, at the top end of fixture 400, an upstream drainage pipe, not shown, is threadedly joined thereto so as to be fitted onto the outside of fixture 400.

Other Embodiments

Whereas in the aforementioned embodiments a check valve and a backflow prevention valve were connected by way of an upstream port, there is no particular limitation with respect thereto. For example, an annular valve seat for a backflow prevention valve may be arranged at the downstream opening of the check valve. Furthermore, whereas a check valve retainer was used to secure the check valve body, so long as the constitution permits this to be secured, there is no particular limitation with respect thereto. For example, the check valve body may secured to the body by means of welding.

Furthermore, whereas in the aforementioned embodiments a single coil spring was used to cause a restoring force to be exerted on the valve member, so long as an upwardly directed restoring force is exerted thereby, there is no particular limitation with respect thereto. Moreover, whereas the valve member was disk-shaped (discoid), there is no particular limitation with respect thereto. For example, this may be bowl-shaped such that the surface that makes contact with the annular valve seat of the check valve is a curved surface, or this may be in the shape of a rectangular plate. Furthermore, whereas the check valve was a lift-type check valve employing a coil spring, it is possible to employ any of a wide variety of types of check valves including swing-type check valves and so forth.

Moreover, whereas the components making up the check valve were, except for the O-ring, made of metal(s) in the aforementioned embodiments, it is sufficient so as to permit the valve at the valve seat to be maintained in a closed state despite occurrence of fire that at least the components responsible for causing closure of the valve at the valve seat by the valve member—which include the valve seat, the valve member, and the restoring force exerting member—be formed from metal(s).

Furthermore, so as to prevent them from sticking to each other, it is preferred that the float and the base in the aforementioned embodiments be made from metal(s). This is because since backflow is an event that occurs only infrequently, it will therefore basically be the case that the float will often be resting on the base, and so where this is formed from resin or the like, it will tend to stick to the base.

Moreover, whereas in the aforementioned embodiments a base was used as constraining member to constrain the lowermost position of the float, so long as the lowermost position can be constrained thereby, there is no particular limitation with respect thereto. For example, this might be a bowl-shaped constraining member having a recess within which the float may rest.

INDUSTRIAL APPLICABILITY

This invention may be utilized in industrial fields in which wastewater drainage systems or the like that cause wastewater generated within buildings or on the premises of factories or the like to be discharged into rivers, oceans, public sewer facilities, or the like, or that cause water used in bathtubs, washrooms, and so forth in ordinary households or the like to be discharged into public sewer facilities and so forth, are implemented, sold, and/or operated.

DESCRIPTION OF REFERENCE CHARACTERS 1, 100, 101 Backflow prevention apparatus
5, 50, 51 Body
10 Check valve
11 Check valve body
12 Spring seat
13 Coil spring (restoring force exerting member)
14 Valve member
15 Annular valve seat
20 Float-type backflow prevention valve
21 Annular valve seat
22 Guide rods (guide members)
23 Base (constraining member)
24 Float

The invention claimed is:

1. A backflow prevention apparatus installed at a wastewater drainage system that extends in a vertical direction, the backflow prevention apparatus being provided with:
 a check valve and a float-type backflow prevention valve, these being installed in this order from an upstream location in the wastewater drainage system;
 wherein the check valve comprises
  a valve seat that is open in a vertical direction;
  a valve member that is disposed below the valve seat, that closes the valve at the valve seat as a result of being made to come in contact with the valve seat due to an upwardly directed restoring force, and that opens the valve at the valve seat as a result of being made to fall when the restoring force is overcome by a hydraulic head of wastewater at a location upstream therefrom; and
  a restoring force exerting member that exerts the upwardly directed restoring force on the valve member; and
 wherein the float-type backflow prevention valve is disposed below the check valve and comprises
  an annular valve seat that is open in a vertical direction;
  a float that is disposed so as to be capable of movement in a vertical direction below the annular valve seat, that rises in accompaniment to a rise in a water level of wastewater and closes the opening at the annular valve seat to close the valve at the annular valve seat, and that falls in accompaniment to a fall in a water level of wastewater and opens the opening at the annular valve seat to open the valve at the annular valve seat;
  a guide member that guides rising and falling movement of the float; and
  a constraining member that constrains a lowermost position of the float,
 the guide member includes a plurality of guide rods extending in the vertical direction and being disposed around the float, and
 the constraining member is a base extending in a horizontal direction, inserted in bottom end portions of the guide rods to be supported by nuts, and includes a plurality of through-holes to thereby allow wastewater to pass therethrough.

2. The backflow prevention apparatus according to claim 1, wherein the backflow prevention apparatus is such that the check valve is such that at least components responsible for causing closure of the valve at the valve seat by the valve member, including the valve seat, the valve member, and the restoring force exerting member, are formed from metal.

3. The backflow prevention apparatus according to claim 1, wherein the backflow prevention apparatus is such that the restoring force exerting member is a coil spring.

* * * * *